United States Patent
Desclos et al.

(10) Patent No.: US 9,002,268 B2
(45) Date of Patent: Apr. 7, 2015

(54) MULTI-FREQUENCY NFC ANTENNA

(71) Applicant: Ethertronics, Inc., San Diego, CA (US)

(72) Inventors: Laurent Desclos, San Diego, CA (US); Sebastian Rowson, San Diego, CA (US); Jeffrey Shamblin, San Marcos, CA (US)

(73) Assignee: Ethertronics, Inc., San Diego, CA (US)

( * ) Notice: Subject to any disclaimer, the term of this patent is extended or adjusted under 35 U.S.C. 154(b) by 55 days.

(21) Appl. No.: 13/623,046

(22) Filed: Sep. 19, 2012

(65) Prior Publication Data

US 2013/0109309 A1 May 2, 2013

Related U.S. Application Data

(60) Provisional application No. 61/536,538, filed on Sep. 19, 2011.

(51) Int. Cl.
*H04B 5/00* (2006.01)
(52) U.S. Cl.
CPC .................... *H04B 5/0075* (2013.01)

(58) Field of Classification Search
USPC ............. 455/41.1, 41.2, 39, 63.4, 121, 575.7; 343/787, 788
See application file for complete search history.

(56) References Cited

U.S. PATENT DOCUMENTS

| | | | |
|---|---|---|---|
| 7,545,383 B2 * | 6/2009 | Morita ........................... | 345/538 |
| 7,688,270 B2 * | 3/2010 | Tsushima ....................... | 343/788 |
| 2013/0281015 A1 * | 10/2013 | Aho et al. ..................... | 455/41.1 |
| 2014/0080411 A1 * | 3/2014 | Konanur et al. ............. | 455/41.1 |

* cited by examiner

*Primary Examiner* — Sonny Trinh
(74) *Attorney, Agent, or Firm* — Coastal Patent Law Group, P.C.

(57) ABSTRACT

An antenna system is proposed that consists of a radiator integrated into the display of a mobile device. The antenna can be configured to service multiple frequency bands to include NFC (Near Field Communication), FM, TV, GPS, and/or Bluetooth/WiFi. When optimized for the NFC function, the display of the mobile device can be pointed in the direction of or positioned in close proximity to the NFC reader to facilitate the transaction, providing a more natural set of motions for the user. The antenna can contain multiple feed or connect points, and can contain active components to switch to or optimize for the various frequency bands.

14 Claims, 6 Drawing Sheets

MULTI-FREQUENCY NFC ANTENNA

CROSS-REFERENCE TO RELATED APPLICATIONS

This application claims benefit of priority to U.S. Provisional Application Ser. No. 61/536,538, filed Sep. 19, 2011, titled "MULTIFREQUENCY NFC ANTENNA"; the contents of which are hereby incorporated by reference.

FIELD OF THE INVENTION

The present invention relates generally to the field of wireless communication. In particular, the present invention relates to near field communication (NFC) antennas for integration with a mobile device, with the NFC antenna being capable of supporting multiple frequency bands.

BACKGROUND OF THE INVENTION

Previous techniques describe integrating low frequency antennas into mobile devices to provide for improved reception of FM radio and VHF and UHF analog and digital television. These techniques address the issues of embedding a low frequency into volume constrained communication devices, and also address the loading effects of the user as well as the structure and components in the mobile device. For cell phones in particular, it is important to consider all antennas in the device and develop a multi-antenna system to provide optimized communication performance at cellular bands as well as GPS, Bluetooth, FM, and other frequency bands.

More recently, near field communication (NFC) requirements have been placed on cell phone designers. NFC systems are becoming more popular, and are used in the retail community to provide a method of conducting financial transactions automatically and seamlessly. NFC is also being used to customize advertisements for individual consumers as well as providing a method of automating the process of registering and documenting coupons in the retail sector.

The difficulty involved in integrating NFC into a mobile device is the low frequency band assigned for this function. The 13.56 MHz frequency band is commonly used for NFC. The read distance, which is the distance that the NFC chipset in the mobile device can be interrogated by an NFC reader (transceiver) needs to be accurately controlled. If the read distance is too great the wrong consumer will be charged for a service during a transaction; if the read distance is too short, the transaction will not be conducted, resulting in a failure. To solve these problems (interrogation distance and frequency band of operation) an inductive coupling approach is taken in NFC system design, wherein two inductive coils, one attached to the NFC transceiver and the other attached to the NFC chipset in the mobile device couple when brought into close proximity. The coupled signal from the NFC reader is used to power the NFC chipset; the NFC chipset can then be commanded to transmit a coded signal back to the NFC reader using the inductive coupled link to complete the transaction.

With typical cell phones being volume constrained the difficulty of integrating an NFC antenna needs to be addressed by the handset design team. Ideally the NFC antenna could be designed an integrated into a mobile device wherein the NFC communication function as well as others communication functions can be serviced by the same radiating structure.

DETAILED DESCRIPTION OF THE PREFERRED EMBODIMENTS

The following embodiment addresses a concept of integrating a near field communication (NFC) antenna into the display portion of a cell phone or smart phones. Additional feed points are designed into the antenna to provide additional frequency bands from the same structure. These additional frequency bands can be used to cover FM and TV applications, or higher frequency functions to include GPS and Bluetooth/Wi-Fi.

This general antenna technique and solution will reduce design and integration time and complexity, and will provide efficient antenna operation across multiple frequency bands. Below 700 MHz. antennas integrated into wireless devices tend to become less efficient and more difficult to impedance match over small to moderate bandwidths due to the increase in wavelength and the typical small form factor of commercial wireless devices. The display provides a good platform to integrate low frequency antennas into due to the size and shape of current displays and due to the glass surface. This glass surface provides a low loss substrate that encompasses a large area, with the display situated on the outer surface of the mobile device.

Figure 1A:
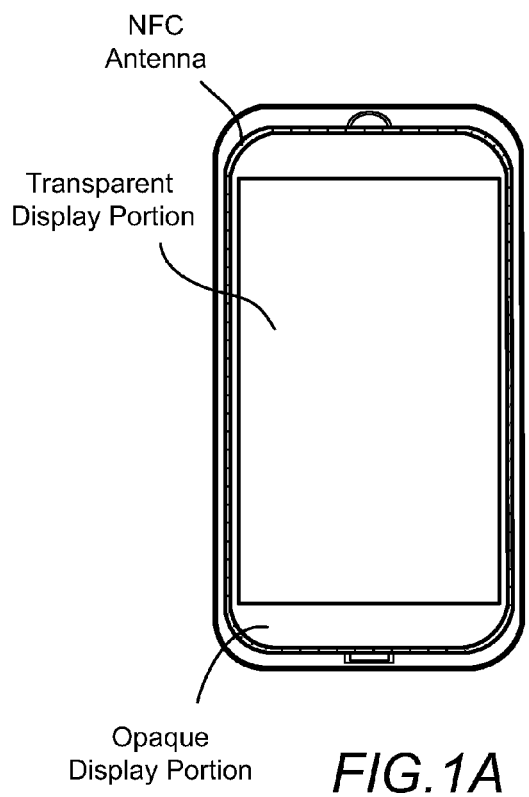
FIGS. 1(A-B) illustrate a mobile communication device with NFC antenna integrated into the display.
Figure 1B:
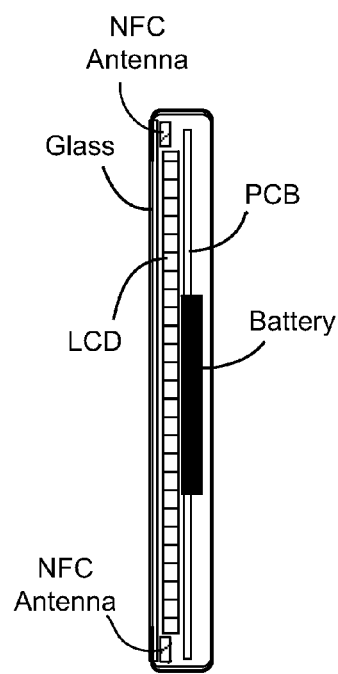

FIGS. 1(A-B) illustrate a mobile communication device with NFC antenna integrated into the display. FIG. 1A shows the device and NFC antenna from a front view. FIG. 1B shows the device and NFC antenna from a rear view. The NFC antenna is attached to the opaque portion of the glass face of the display. The NFC antenna can be placed behind the opaque glass.

Figure 2A:
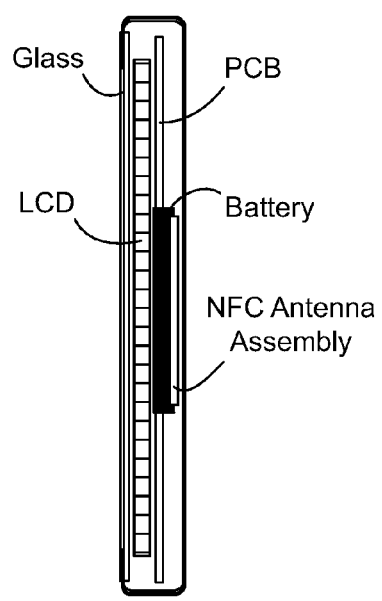
FIGS. 2(A-B) illustrate a typical case where an NFC antenna is attached to the battery of the mobile communication device.
Figure 2B:
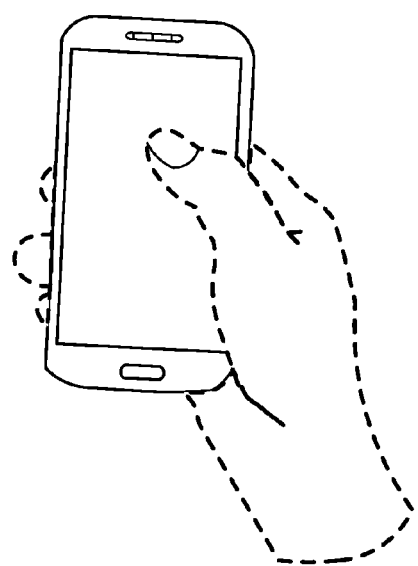

FIG. 2A illustrates a typical case where an NFC antenna is attached to the battery of the mobile communication device. As shown in FIG. 2B, the user's hand covers the back side of the mobile device during normal operation of the mobile device, making use of the NFC function inconvenient.

Figure 3:
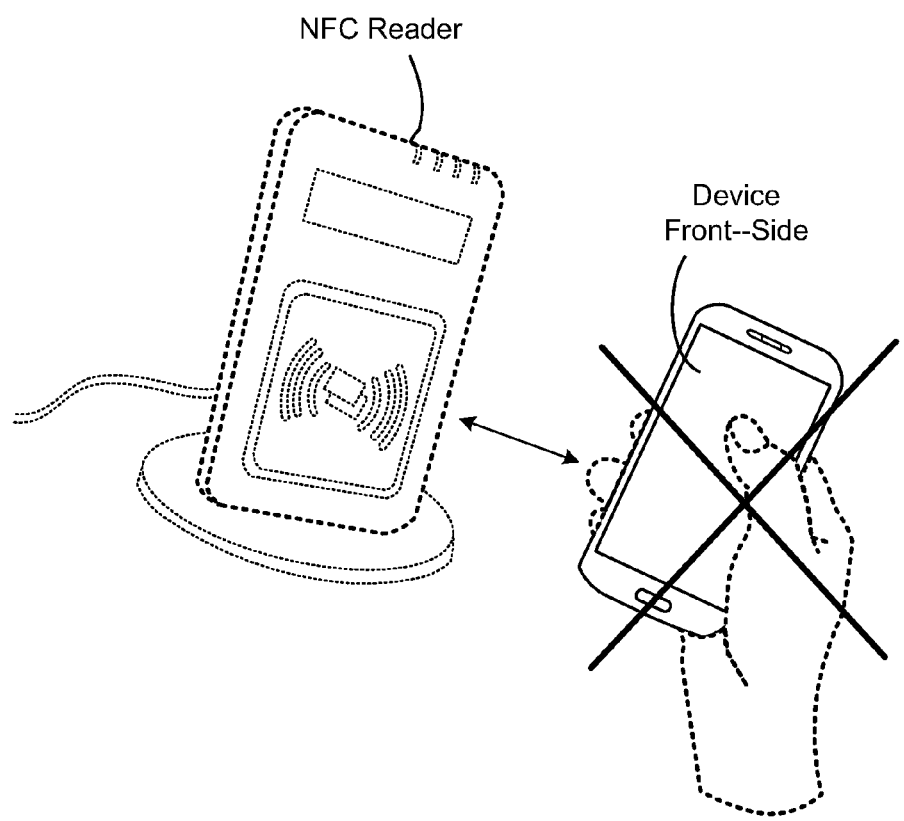
FIG. 3 illustrates the use of a typical mobile device, where the user attempts to exercise the NFC function prior to rotating the mobile device to expose the NFC antenna to the NFC reader used to complete a transaction.

FIG. 3 illustrates the use of a typical mobile device, where the user attempts to exercise the NFC function prior to rotating the mobile device to expose the NFC antenna to the NFC reader used to complete a transaction. The user typically places the display-side of the device toward the NFC reader. Typical NFC antenna configurations in mobile devices require the user to flip or rotate the mobile device to position the NFC antenna within close proximity to the NFC reader.

Figure 4:
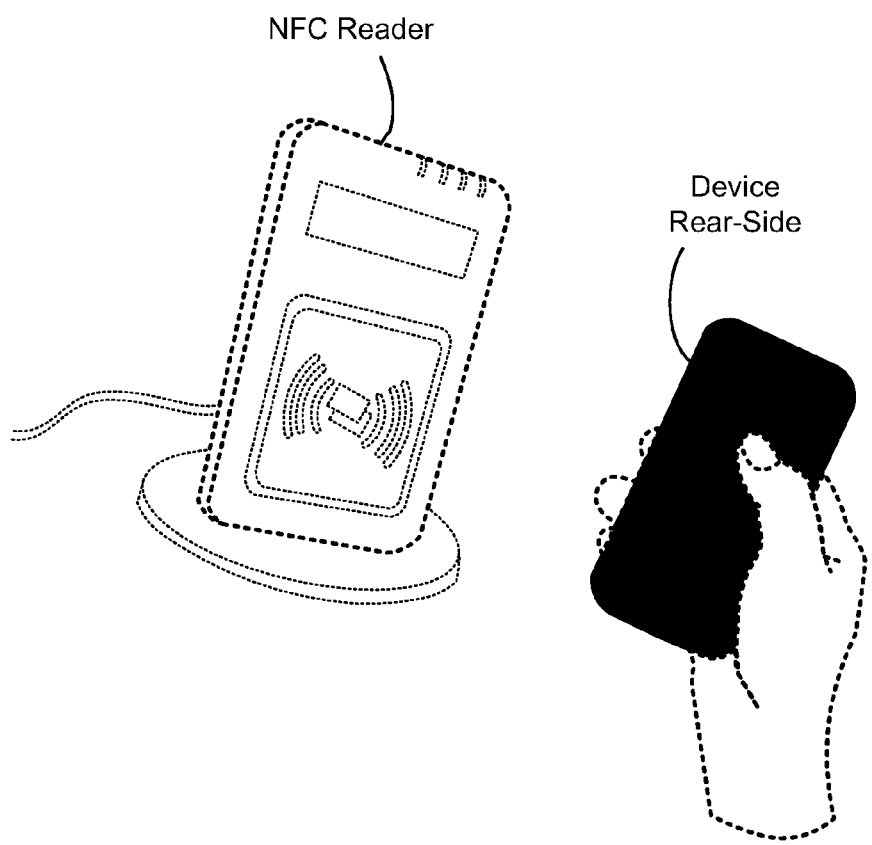
FIG. 4 illustrates the orientation of the mobile device required to successfully use the NFC function when the NFC antenna is attached to the battery located on the back side of the mobile device.
Figure 5A:
FIGS. 5(A-D) illustrate typical shapes of antenna patterns for the NFC antenna that can be integrated into the glass layer of the display of a mobile communication device.
Figure 5B:
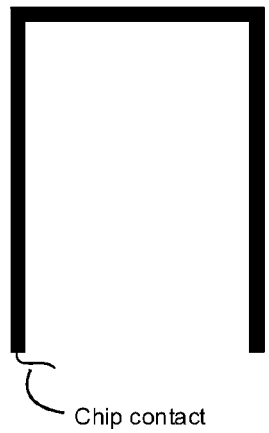
Figure 5C:
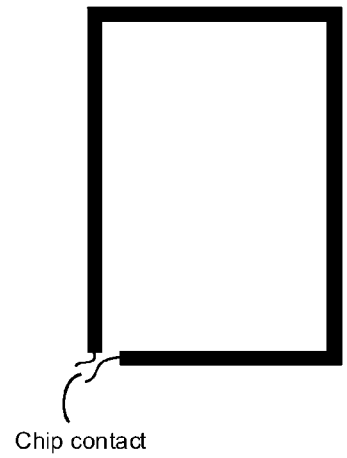
Figure 5D:
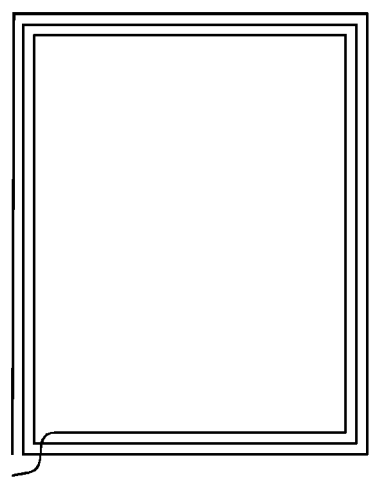

FIG. 4 illustrates the orientation of the mobile device required to successfully use the NFC function when the NFC antenna is attached to the battery located on the back side of the mobile device. Typical NFC antenna configurations in mobile devices require the user to flip or rotate the mobile device to position the NFC antenna within close proximity to the NFC reader.

FIGS. 5(A-D) illustrate typical shapes of antenna patterns for the NFC antenna that can be integrated into the glass layer of the display of a mobile communication device. FIG. 5A shows a simple shape antenna pattern. FIG 5B shows a u-shape antenna pattern. FIG. 5C shows a loop antenna pattern. FIG. 5D shows a spiral coil antenna pattern. Each is shown with respective chip contacts.

Figure 6:
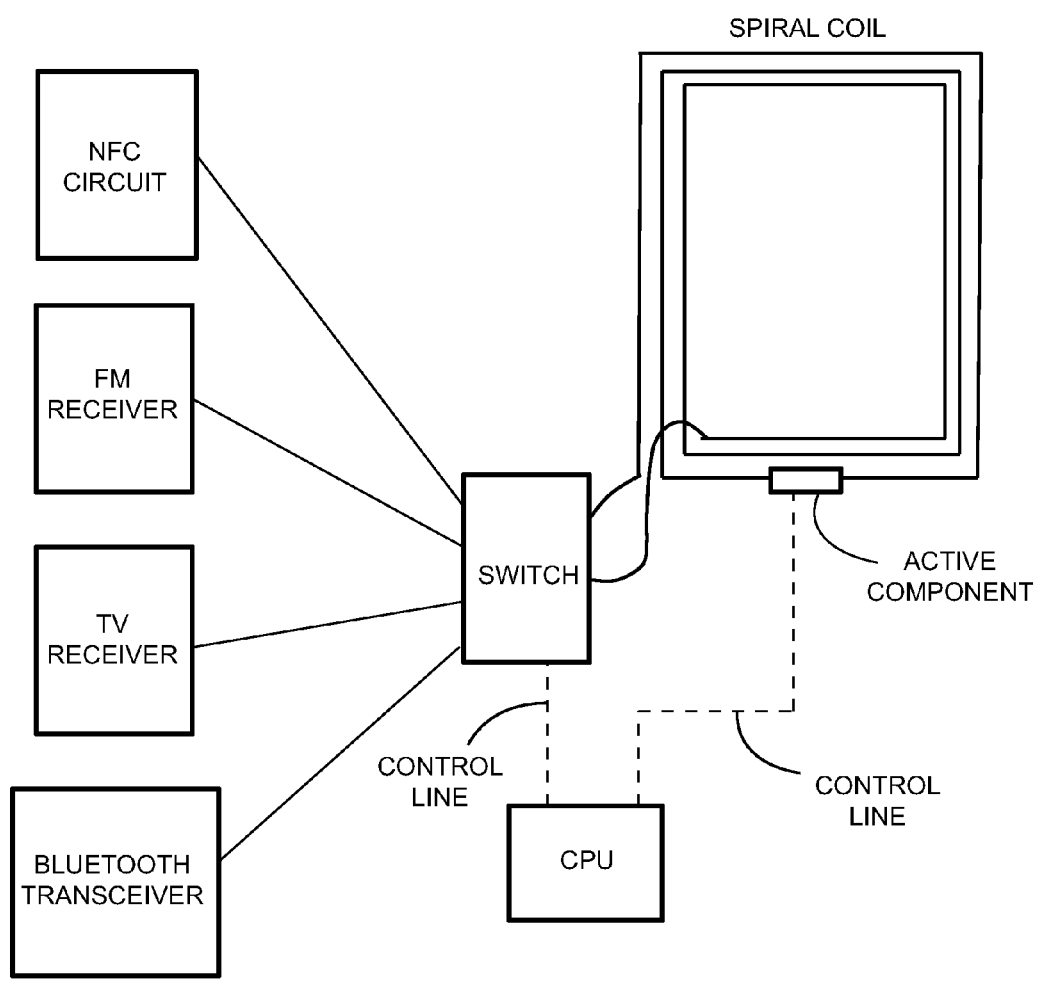
FIG. 6 illustrates a configuration where multiple receivers or transceivers can be connected to a common antenna using a multi-port switch.

FIG. 6 illustrates a configuration where multiple receivers or transceivers can be connected to a common antenna using a multi-port switch. The multiple receivers can include a NFC circuit, FM receiver, TV receiver, and Bluetooth receiver as shown. An active component is coupled to the antenna and is used to alter the resonant frequency of the common antenna. Control signals for the switch and active component are provided by the CPU located in the mobile communication device. The single antenna can be integrated into the display of the mobile communication device.

The invention claimed is:

1. An antenna system, comprising:
   within a display assembly having a glass layer thereof, a conductor embedded in the glass layer of the display assembly, the glass layer forming a low-loss substrate surrounding the conductor;
   the conductor being bent in a shape configured to generate an inductive field capable of coupling to an external field when connected to a receiver, transceiver, or circuit that modulates impedance.

2. The antenna system of claim 1, wherein the conductor is optimized to resonate at the 13.56 MHz frequency band when connected or coupled to the receiver, transceiver, or circuit that modulates impedance.

3. The antenna system of claim 1, further comprising: one or more active components, each of said one or more active components being individually coupled to a portion of the conductor; wherein the one or more active components are each configured to connect or disconnect portions of the conductor to form a continuous loop or to provide a conductor that is not connected at one end.

4. The antenna system of claim 3, wherein said one or more active components are individually selected from: tunable capacitors, tunable inductors, diodes, and switches.

5. The antenna system of claim 3, further comprising:
   a multiport switch coupled to said conductor, said multiport switch being further coupled to two or more devices of the group consisting of: a Bluetooth receiver, TV receiver, FM receiver, and an NFC circuit; and
   a CPU coupled to said multiport switch and further coupled to at least one of the one or more active components;
   wherein said CPU is configured to communicate signals to the active components for actively varying a length of the conductor;
   and wherein said CPU is further configured to communicate signals to the multiport switch for connecting the conductor to one of the devices.

6. The antenna system of claim 1, wherein said conductor is configured to form at least one of: a coil, monopole, dipole, inverted F antenna (IFA), microstrip antenna, single resonance Isolated Magnetic Dipole (IMD) antenna, dual resonance IMD antenna, planar IMD antenna, or a wire.

7. The antenna system of claim 1, further comprising: one or more active components, each of said one or more active components being individually coupled to a portion of the conductor; wherein the one or more active components are each configured to vary a reactance of the conductor to adjust a resonant frequency thereof.

8. The antenna system of claim 7, further comprising:
   a multiport switch coupled to said conductor, said multiport switch being further coupled to two or more of the group consisting of: a Bluetooth receiver, TV receiver, FM receiver, and an NFC circuit; and
   a CPU coupled to said multiport switch and further coupled to at least one of the one or more active components;
   wherein said CPU is configured to communicate signals to the active components for actively varying a frequency response of the conductor;
   and wherein said CPU is further configured to communicate signals to the multiport switch for connecting the conductor to the respective receiver or circuit.

9. The antenna system of claim 1, wherein said conductor is configured to form one or more of: a linear, u-shape, loop, or spiral coil antenna.

10. An multi-frequency NFC antenna system, comprising:
    a conductor coupled to an active component to form a multi-frequency antenna;
    said conductor being coupled to a switch, wherein said switch is adapted to couple to a plurality of devices selected from: a Bluetooth receiver, TV receiver, FM receiver, and NFC circuit; and
    a CPU coupled to each of the switch and the active component via control lines extending therebetween, the CPU being configured to vary a frequency response of the conductor to achieve one of a plurality of possible frequencies thereof, and the CPU being further configured to control the switch for connecting the multi-frequency antenna to one of said devices.

11. The multi-frequency NFC antenna system of claim 10, comprising two or more active components coupled to each of the conductor and the CPU.

12. The multi-frequency NFC antenna system of claim 10, wherein said multi-frequency antenna comprises a first conductor portion connected to a second conductor portion at a first active component, the first and second conductor portions forming a length of the conductor.

13. The multi-frequency NFC antenna system of claim 10, wherein said multi-frequency antenna comprises a conductor coupled to an active component selected from: a tunable capacitor, or a tunable inductor; wherein said active component is configured to vary a reactance of the conductor for altering a frequency response of the antenna.

14. The multi-frequency NFC antenna system of claim 10, wherein said conductor is embedded in a glass layer of a display assembly, the glass layer forming a low-loss substrate surrounding the conductor.

* * * * *